Patented Mar. 22, 1932

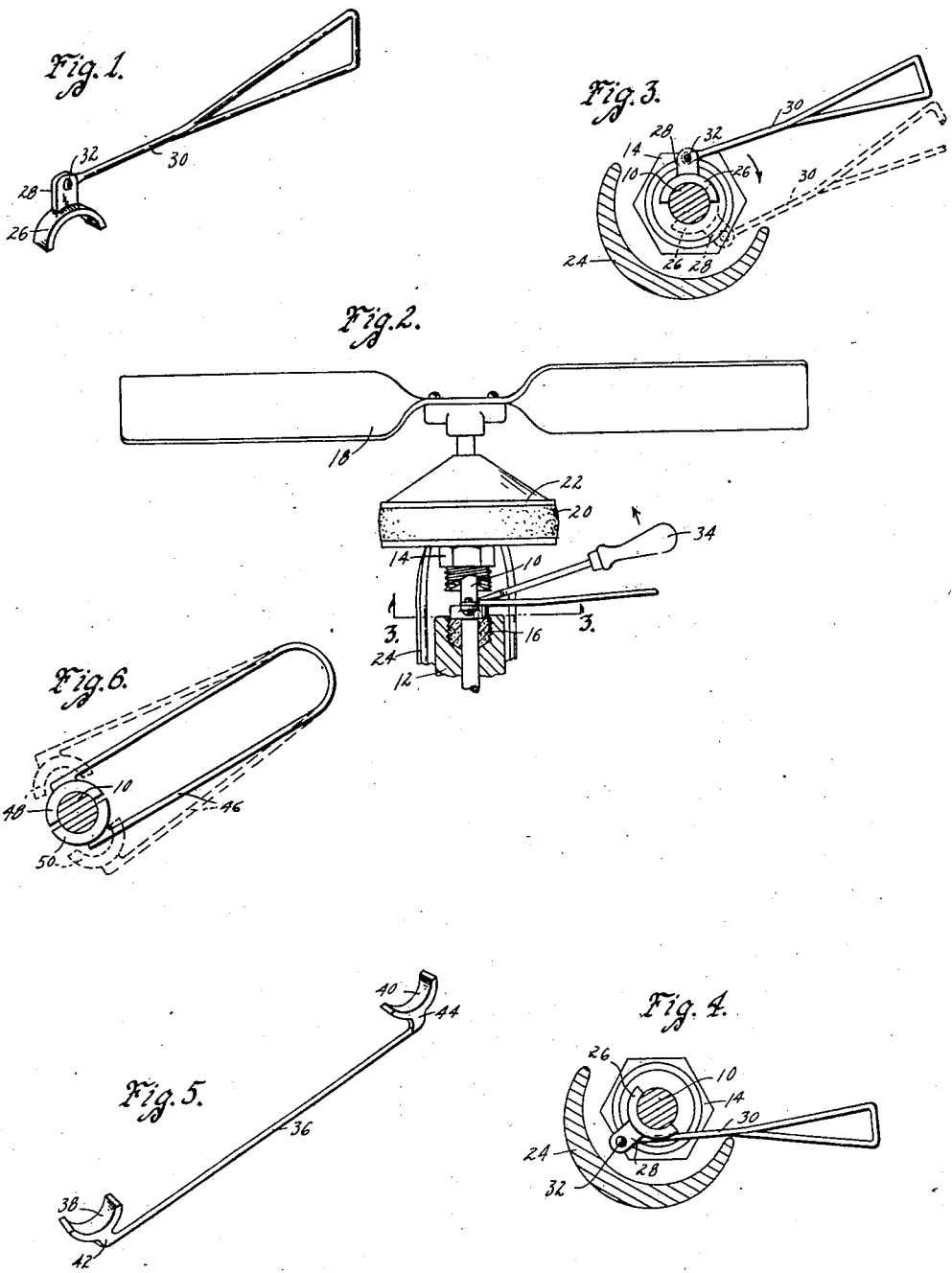

1,850,459

UNITED STATES PATENT OFFICE

VERNON JEFFERIS, OF ANITA, IOWA

PACKING TOOL

Application filed November 24, 1930. Serial No. 497,833.

The object of this invention is to provide an improved construction for a tool especially designed for pressing the packing material into a packing gland.

More especially an object of the invention is to provide an improved packing tool which is capable of being used in connection with the packing of glands where the working space is restricted, thus making it difficult to perform the operation by ordinary methods and with ordinary equipment.

A further object of the invention is to provide an improved packing tool including a semi-cylindrical presser member adapted to be mounted in partially embracing relation to a shaft for exerting pressure upon packing material for forcing it into a packing gland, the presser member being provided with a laterally projecting handle arranged in a plane substantially parallel to a diametrical line through the presser member.

A further object of the invention is to provide an improved packing tool which is especially useful for pressing the packing material into the packing gland of a water pump on a motor vehicle or the like where the working space between the packing gland and other members is materially restricted, thus rendering it difficult to gain access to the interior of the packing gland.

Another and further object of the invention is to provide an improved packing tool which is simple and inexpensive and at the same time capable of being employed in an efficient manner for inserting packing material easily and quickly and without danger of damaging the screw threads in the packing gland.

Still another object is to provide a packing tool having its parts so arranged that the presser member may be manipulated into different positions relative to the packing gland for pressing the packing material firmly in place entirely around the shaft.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:—

Figure 1 is a perspective view of one form of my improved packing tool, this type of tool having a handle which is pivotally connected to the presser member.

Figure 2 is a plan view, partly in section, illustrating this form of the tool in position for practical use relative to the packing gland of an automobile water pump.

Figure 3 is an enlarged vertical section on the line 3—3 of Figure 2, showing the tool in two different positions which it may assume in use.

Figure 4 is a sectional view similar to Figure 3 and showing the presser member in still another position.

Figure 5 is a perspective view of a modified form of the tool in which a presser member is mounted at each end of a substantially straight handle.

Figure 6 is a sectional elevation illustrating a further modified form of tool in position for use relative to a shaft. This form of the tool employs two semi-cylindrical packing members on the ends of a U-shaped handle and the dotted lines indicate the manner of placing and removing the tool relative to the shaft.

Those who are accustomed to working with automobiles and other motor vehicles have found that a difficult and tedious task is to be found in the replacing of packing material in the packing gland of water pumps of many types of vehicles. The pump shaft in many vehicles is also employed for carrying the fan of the cooling system, and since it is desirable to place the fan close to the front end of the motor and immediately in front of the packing gland for the shaft, it follows that the working space is necessarily greatly restricted. This makes it difficult to get at the packing gland for placing the packing material therein because the packing nut which encircles the shaft can be moved only a short distance away from the open end of the gland.

It is particularly for such locations as above indicated that my improved tool has been designed and in producing this tool I have had in mind the necessity of providing a tool which is capable of being inserted in the restricted location between the gland and nut and in partially embracing relation to the shaft, whereupon the presser member may be forcibly moved in a direction longitudinally of the shaft and into the opening of the gland for engaging and firming the packing material therein. The force for compressing the packing material is applied by means of a separate tool such as a screw driver, bar or other flat tool.

In Figure 2 there is shown a characteristic installation in which my improved tool is especially desirable for use in inserting the packing material. I have employed the numeral 10 to designate a shaft such as a pump-fan shaft of a motor. On the shaft 10 is mounted a packing gland 12 and a packing nut 14 which cooperates therewith in holding packing material such as 16 for the shaft 10. As is usual the packing gland 12 has a cavity for the packing material 16 and this cavity is internally threaded to receive a threaded portion of the nut 14.

On the forward end of the shaft 10 is mounted a fan 18 of the cooling system and the shaft is driven by a belt 20 engaging a pulley 22 fixed to the shaft between the fan and the packing gland. There is a relatively short space between the forward end of the gland 12 and the pulley 22 so that the nut 14, when disengaged from the gland, can move only a relatively short distance away from the gland. In other words, the working space between the removed nut and the gland is greatly restricted, thus making it difficult to insert and properly pack the packing material such as 16 within the gland.

There is also in this installation a substantially semi-cylindrical or trough-like frame member 24 which is located beneath a portion of the shaft 10 and beneath the packing gland 12, bridging the space between said gland and the pulley 22. The frame member 24 provides a bearing support for the forward end of the shaft and the pulley 22 and at the forward end of the gland 12 is substantially concentric with the shaft and spaced only a relatively small distance below the packing gland. This arrangement and location of the parts affords a further restriction of the working space available for the operation of packing the gland because the lower part of the gland and shaft are substantially enclosed by said frame member.

In the type of packing tool illustrated in Figures 1 to 4 inclusive, I provide a substantially semi-cylindrical presser member 26 which is of such diameter and thickness of material that it is capable of being mounted concentrically or in partially embracing relation to the shaft 10 and is permitted to enter the cavity of the packing gland 12 when the nut 14 has been unthreaded and moved longitudinally of the shaft away from the gland, as shown in Figure 2.

Formed on and radially projecting in an outward direction from the central portion of the presser member 26 is an ear 28 to which a handle 30 is pivotally attached. The handle 30 projects laterally in a plane substantially parallel to a diametrical line through the presser member 26 and is attached to the ear by a pivot member 32. The pivot member may be formed integrally on the end of the handle 30, or it may be in the form of a separate screw, but in any event it preferably is countersunk in an aperture in the ear 28.

The ear 28 is located at one end of the longitudinal dimension of the presser member 26, or in other words the presser member 26 projects laterally in one direction from the vertical plane of the ear 28. This arrangement permits a portion of the presser member 26 to be received within the cavity of the packing gland 12 without interference by the ear 28 or handle 30.

In the use of this form of the tool the packing nut 14 is first detached from the gland and moved lengthwise on the shaft as shown in Figure 2. After the packing material such as 16 has been put in place manually the tool is employed for firming and pressing it into the cavity of the gland for producing the desired packing effect about the shaft.

In performing this operation, the workman takes the handle 10 in one of this hands and places it in such position that the presser member 26 will engage a portion of the shaft 10 between the gland 12 and nut 14 as shown in Figure 2. Then pressure is applied to the outer face of the presser member 26 by means of a separate tool such as a screw driver 34 held in the other hand of the workman. A prying effect may be had by the proper use of the tool 34, working against the adjacent end of the nut 14 or other parts of the installation, so that considerable pressure may be applied to the member 26 for properly forcing the packing material into place in the cavity of the gland.

The position of the presser member 26 on the shaft 10 may be shifted from time to time by manipulating the handle 30 so that the presser member 26 is caused to travel in directions circumferentially of the shaft. This method of manipulation may be continued to such extent, accompanied by pressure through the use of the tool 34, that the packing material is compressed entirely around the shaft. This method of shifting the presser member is indicated in Figures 3 and 4. In Figure 3, the tool is shown in solid lines with the presser member engaging substantially the upper half of the shaft while the dotted lines indicate another position substantially opposite thereto and on the lower right hand portion of the shaft. In Figure 4, the presser member is shown as engaging the lower left hand portion of the shaft.

It will be apparent that the pivotal connection of the handle to the presser member permits the presser member to be rotated about the shaft in either direction. In other words, the presser member may first be placed on the upper portion of the shaft and used in such position. Thereafter, downward pressure may be exerted on the inner end of the handle 30 to cause the presser member to travel downwardly about the shaft as indicated by the arrow in Figure 3, the presser member thus passing between the shaft and the frame member 24 and the handle swinging on its pivot sufficiently to permit the presser member to pass even to the extreme position shown in Figure 4. Thus, the workman may accomplish the desired packing of the packing material entirely around the shaft by working from one side of the installation.

As shown in Figure 2 the handle 30 may be bent slightly between its ends, thus making it easier to insert the presser member into the desired location and apply pressure thereto, particularly in some types of installations in which there may be obstructing members on portions of the installation.

In the form of tool shown in Figure 5 there is a substantially straight handle member 36 having a substantially semi-cylindrical presser member at each end, these presser members being indicated by the numerals 38 and 40. The handle 36 is attached rigidly to the central portions of the arcuate presser members by means of ears or offset portions 42 and 44 respectively. The ears 42 and 44 are located at ends of the presser members with consideration to their longitudinal dimensions, or in other words, the presser members project laterally in one direction from the plane of the ears and handle.

If desired, the presser members 38 and 40 may be tipped slightly toward the central portion of the handle 36 so that a radial line through the point of attachment to the handle will be oblique rather than perpendicular thereto. This, in some types of installations, facilitates the operation of inserting the presser members in the desired locations.

It will be understood that with the form of tool shown in Figure 5, one of the presser members will be caused to engage substantially the upper half of a shaft such as 10 while the other presser member will be caused to engage substantially the lower half by inverting the tool. This form of the tool is capable of some shifting movement of its presser members about the shaft, but of course not to the extent capable with the tool having a pivoted handle. This limitation is true particularly of an installation having a frame member such as 24 or other obstructing members near the shaft and packing gland.

In the form of tool illustrated in Figure 6 there is a looped or U-shaped handle 46, carrying at each of its ends a substantially semi-cylindrical presser member, which members are designated by the numerals 48 and 50. The handle 46 is of resilient material and is capable of being sprung slightly to the position indicated by dotted lines to permit the presser members 48 and 50 to embrace a shaft such as 10.

The ends of the handle 46 are attached to central portions of the presser members 48 and 50, with respect to their curvature, but such attachment is also at one end of each presser member, with respect to its longitudinal dimension. This permits the presser members to be simultaneously moved within the cavity of a packing gland for exerting pressure on the packing material. In this form of the device it will also be noted that the ends of the handle are spaced somewhat or offset from the outer circumference of the presser members as in the other forms of the tool.

One or the other of the tools herein shown and described can be employed in any installation with which I am familiar for efficiently pressing and firming the packing material into the gland. The form shown in Figure 1 is more universal in character because it is capable of greater manipulation for placing the presser members in different locations for work.

In all of the disclosed forms of the tool the handle projects laterally from the presser member or members and is offset or spaced at its point of attachment from the outer circumferential line of the presser member. This enables the device to be inserted in a very small space as is often necessary.

Inasmuch as the presser member is held snugly in contact with the shaft 10 and pressure is applied by a separate tool, there is no danger of contact of the presser with the threads of the gland 12, such as would cause injury to the threads.

It will be understood that the tool may be constructed of different dimensions for different installations if such variation should be necessary. The construction of this improved tool allows the operator to place the tool in any desired position on the shaft in difficult or restricted places and to press the packing easily and quickly into the packing gland. By the use of this tool the packing operation can be performed in much less time than with ordinary equipment and without much danger of injury to the parts of the installation.

I claim as my invention:—

1. A tool for use in compressing packing material within an open gland and about a shaft or the like, comprising a substantially semi-cylindrical presser member adapted to partially embrace the shaft, and a handle attached to the central portion of said presser member, said handle projecting laterally from the presser member in a plane perpendicular to the longitudinal axis thereof, said presser member projecting laterally from the plane of attachment of the handle to permit it to enter the open end of the gland.

2. A tool for use in compressing packing material within an open gland and about a shaft or the like, comprising a substantially semi-cylindrical presser member adapted to partially embrace the shaft, and a handle pivotally attached to and projecting laterally from the presser member in a direction substantially parallel to a radius thereof, said presser member projecting laterally from the plane of attachment of the handle to permit it to enter the open end of the gland.

3. A tool for use in compressing packing material within an open gland and about a shaft or the like, comprising a substantially semi-cylindrical presser member adapted to partially embrace the shaft, said presser member being formed with an ear projecting from its outer circumference at a point spaced from one of its longitudinal ends, and a handle pivotally attached to said ear and projecting laterally and movable through an arc in a plane substantially perpendicular to the longitudinal axis of the member.

4. A tool for use in compressing packing material within an open gland and about a shaft or the like, comprising a handle, and a pair of substantially semi-cylindrical presser members, each fixed to one end of said handle and projecting laterally therefrom in a direction axially of the member, to permit said members to be inserted in the open end of the gland in partially embracing relation to the shaft, with the handle projecting laterally away from the shaft.

Des Moines, Iowa, November 18, 1930.

VERNON JEFFERIS.